US012110710B2

(12) United States Patent
Geringer et al.

(10) Patent No.: US 12,110,710 B2
(45) Date of Patent: Oct. 8, 2024

(54) ELECTRIC LOCK WITH LATCH RETRACTOR

(71) Applicant: 1 Adolfo, LLC, Camarillo, CA (US)

(72) Inventors: Arthur V. Geringer, Oak Park, CA (US); David A. Geringer, Camarillo, CA (US)

(73) Assignee: 1 Adolfo, LLC, Camarillo, CA (US)

( * ) Notice: Subject to any disclaimer, the term of this patent is extended or adjusted under 35 U.S.C. 154(b) by 1034 days.

(21) Appl. No.: 15/076,458

(22) Filed: Mar. 21, 2016

(65) Prior Publication Data

US 2016/0273243 A1 Sep. 22, 2016

Related U.S. Application Data

(60) Provisional application No. 62/135,898, filed on Mar. 20, 2015.

(51) Int. Cl.
*E05B 47/00* (2006.01)
*E05C 1/08* (2006.01)

(52) U.S. Cl.
CPC ...... *E05B 47/0012* (2013.01); *E05B 47/0001* (2013.01); *E05B 47/0005* (2013.01); *E05C 1/08* (2013.01); *E05B 2047/0014* (2013.01)

(58) Field of Classification Search
CPC .. E05B 47/00; E05B 47/0001; E05B 47/0002; E05B 47/0003; E05B 47/0004; E05B 47/0005; E05B 47/0012; E05B 47/02; E05B 47/026; E05B 2047/0014; E05B 2047/0018; E05B 2047/0037; E05B 2047/0091
See application file for complete search history.

(56) References Cited

U.S. PATENT DOCUMENTS 4,017,107 A 4/1977 Hanchett et al.
4,099,752 A * 7/1978 Geringer ............. E05B 47/0002 292/144
4,439,808 A 3/1984 Gillham
4,557,121 A * 12/1985 Charlton ............. E05B 47/0002 70/129
4,579,376 A * 4/1986 Charlton ............. E05B 47/0002 292/144
4,609,910 A 9/1986 Geringer et al.
(Continued)

*Primary Examiner* — Christopher J Boswell
(74) *Attorney, Agent, or Firm* — Ferguson Case Orr Paterson LLP

(57) ABSTRACT

The present invention provides an improved electric lock that allows for electrically controlled retraction of latch bolt to allow for opening of the door in which the lock is installed. The components that allow for retraction are primarily internal to the lock and have means for conducting electrical signals to the lock to allow for remote control of the latch retraction. In some embodiments, the locks comprise an electrically controllable actuator and at least one retraction lever configured to retract the latch bolt against an applied bias. The actuator can be configured with various other internal components such that movement of the other internal components in one direction, such as toward the actuator, causes movement of the latch bolt in the opposite direction, such as away from the actuator. This opposing movement can allow for different electrical arrangements within different locks having relatively small internal spaces.

18 Claims, 4 Drawing Sheets

(56) References Cited

U.S. PATENT DOCUMENTS

| | | | | |
|---|---|---|---|---|
| 4,626,010 | A | 12/1986 | Hanchett et al. | |
| 4,652,028 | A | 3/1987 | Logan et al. | |
| 4,677,834 | A * | 7/1987 | Hicks | E05B 47/0002 292/144 |
| 4,720,128 | A | 1/1988 | Logan et al. | |
| 4,902,053 | A * | 2/1990 | Hakkarainen | E05B 47/0002 292/144 |
| 5,000,497 | A | 3/1991 | Geringer et al. | |
| 5,484,180 | A | 1/1996 | Helmar | |
| 5,566,991 | A * | 10/1996 | Young | E05B 47/0012 292/201 |
| 5,876,073 | A | 3/1999 | Geringer et al. | |
| 6,293,131 | B1 * | 9/2001 | Lemettinen | E05B 47/0002 292/169.14 |
| 6,299,222 | B1 * | 10/2001 | Atmodimedjo | E05B 15/102 292/144 |
| 6,354,121 | B1 * | 3/2002 | Frolov | E05B 47/0692 292/144 |
| 7,246,827 | B2 * | 7/2007 | Geringer | E05B 47/0669 292/144 |
| 9,334,676 | B2 * | 5/2016 | Lambrou | E05B 47/0673 |
| 9,551,174 | B2 * | 1/2017 | Bartos | E05B 47/0004 |
| 9,787,127 | B2 * | 10/2017 | Shen | H02J 7/025 |
| 2005/0225097 | A1 * | 10/2005 | Geringer | E05B 47/0657 292/144 |

* cited by examiner

ELECTRIC LOCK WITH LATCH RETRACTOR

CROSS REFERENCE TO RELATED APPLICATIONS

This application claims the benefit of U.S. Provisional Application Ser. No. 62/135,898 to Arthur Geringer, et al., entitled ELECTRIC LOCK WITH LATCH RETRACTOR, filed on Mar. 20, 2015, which is hereby incorporated herein in its entirety by reference.

BACKGROUND OF THE INVENTION

Field of the Invention

The present invention relates to door locks, and in particular to electric door locks with electrically controllable latch retractors.

Description of the Related Art

Security doors to prevent theft or vandalism have evolved over the years from simple doors with heavy duty locks to more sophisticated egress and access control devices. Hardware and systems for limiting and controlling egress and access through doors are generally utilized for theft-prevention or to establish a secured area into which (or from which) entry is limited. For example, retail stores use such secured doors in certain departments (such as, for example, the automotive department) which may not always be manned to prevent thieves from escaping through the door with valuable merchandise. In addition, industrial companies also use such secured exit doors to prevent pilferage of valuable equipment and merchandise.

One type of door lock which has been used in the past to control egress and access through a door is an electromagnetic system which utilizes an electromagnet mounted on a door jamb, with an armature mounted on the door held by the electromagnet to retain the door in the closed position when the electromagnet is actuated. Such locking mechanisms are illustrated in U.S. Pat. No. 4,439,808, to Gillham, U.S. Pat. No. 4,609,910, to Geringer et al., U.S. Pat. No. 4,652,028, to Logan et al., U.S. Pat. No. 4,720,128, to Logan, Jr., et al., and U.S. Pat. No. 5,000,497, to Geringer et al. All of these references utilize an electromagnet mounted in or on a door jamb and an armature on the door held by the electromagnet to retain the door in the closed position. Such electromagnetic locking systems are quite effective at controlling egress and access through the door they are installed on. Unfortunately, however, such systems are quite expensive, and require a fairly complex installation, often with the electromagnet being mounted in the door jamb.

Another type of system which is known in the art is the electric door strike release mechanism, in which a latch bolt located in and extending from a locking mechanism located in a door is receivable in an electrically operable door strike mounted in the frame of the door. The door may be opened either by retracting the latch bolt into the locking mechanism to thereby disengage it from the door strike, or by electrically actuating the door strike mechanism to cause it to open and to thereby release the extended latch bolt from the door strike mechanism. Typically, such electrically operable door strikes pivot to allow the door to close without the door strike mechanism being electrically actuated. Such door strike mechanisms are illustrated in U.S. Pat. No. 4,017,107, to Hanchett, U.S. Pat. No. 4,626,010, to Hanchett et al., and in U.S. Pat. No. 5,484,180, to Helmar. Like the electromagnet/armature systems discussed above, electrically operated door strike systems are also expensive, and require a significant installation into the door jamb, which must usually be reinforced.

Electrically operable door locks have also been developed that can be installed on a door through which access is controlled by an electrically operable security system. Such a lock is disclosed in U.S. Pat. No. 5,876,073, to Geringer et al. The door opening mechanism of the door lock is selectively locked and unlocked by controlling the supply of electricity to the door lock to thereby control access or egress through the door. The electrically operable door lock uses an electromagnetic actuator to drive a locking member between a locked position in which it engages a latch actuating member to prevent it from being rotated to retract a latch bolt to open a door, and an unlocked position in which it is disengaged from the latch actuating member to allow it to be rotated to retract the latch bolt to open the door. By reversing the position of the electromagnetic actuator in the door lock apparatus, the system may operate in either a failsafe mode in which the electromagnetic actuator must be powered to unlock the door, or a failsafe mode in which the electromagnetic actuator must be powered to lock the door.

SUMMARY OF THE INVENTION

The present invention provides an improved electric lock that allows for electrically controlled retraction of a latch bolt to allow for opening of the door in which the lock is installed. The components that allow for retraction are primarily internal to the lock and have means for conducting electrical signals to the lock to allow for remote control of the latch retraction. The locks according to the present invention are compact and robust and provide improved mechanisms and systems for controlling ingress and egress through one or a plurality of doors.

In one embodiment, an electric lock comprises a housing, a latch bolt within the housing, a bias mechanism configured to bias the latch bolt in a position extended from the housing, at least one retraction lever configured such that its movement causes the latch bolt to retract into said housing against the bias, and an electrically controllable actuator configured to move the retraction lever to retract the latch bolt in response to an electrical signal.

In another embodiment, an electric lock comprises a housing, a latch bolt within the housing, a bias mechanism configured to bias the latch bolt in a position extended from the housing, a first retraction lever configured such that its movement causes the latch bolt to retract into the housing against said bias, a second retraction lever configured such that its movement causes the latch bolt to retract into said housing against its bias, a manually operable opening lever connected to the first retraction lever such that its movement causes the first retraction lever to retract the latch bolt, and an electrically controllable actuator configured to move the second retraction lever to retract said latch bolt in response to an electrical signal.

In yet another embodiment, an electric lock comprises a housing, a latch bolt within the housing, a bias mechanism configured to bias the latch bolt in a position extended from the housing, a first retraction lever configured such that its movement causes the latch bolt to retract into the housing against its bias, a second retraction lever configured such that its movement causes the latch bolt to retract into said housing against its bias, a door knob comprising an inside door knob portion and an outside door knob portion and connected to the first retraction lever such that movement of the inside doorknob portion or the outside doorknob portion causes the first retraction lever to move, an electrically controllable actuator configured to move the second retraction lever to retract the latch bolt in response to an electrical signal, and at least one auxiliary latch within the housing comprising an extended position and a retracted position.

These and other features and advantages of the invention will be apparent to those skilled in the art from the following detailed description, taken together with the accompanying drawings.

DETAILED DESCRIPTION OF THE INVENTION

Figure 1:
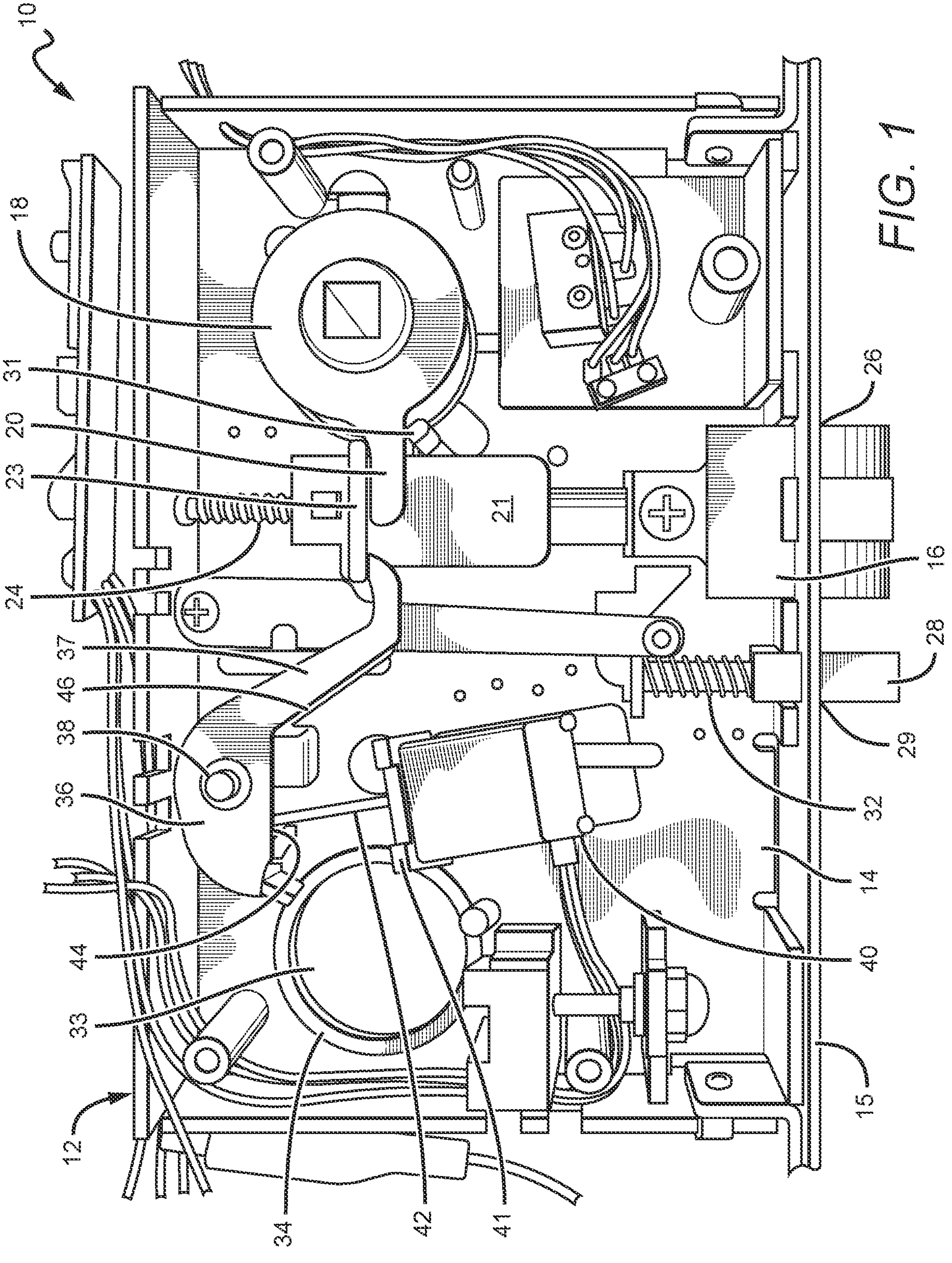
FIG. 1 is a top view of one embodiment of a lock incorporating features of the present invention.

The present invention is directed to electrically controllable locks having internal mechanisms that allow for electrically controllable retraction of a latch bolt. The present invention can be used in many different locks, but is particularly applicable to relatively small locks that can be mounted in doors, such as mortise locks. The present invention is particularly arranged to locks having relatively little space within their housings, yet are arranged such that most or all of the components for electrical operation and control can be within the lock. This allows for ease of installation and operation. Some lock embodiments according to the present invention can be electrically controllable to retract and extend the latch bolt from the lock housing, to allow for opening of the door.

The embodiments herein are described with reference to a particular lock but it should be understood that the inventions can be similarly used in other types of locks and other devices unrelated to locks. The components described herein can have many different shapes and sizes beyond those shown and can be arranged in many different ways beyond those described herein.

The present invention is described herein with reference to certain embodiments, but it is understood that the invention can be embodied in many different forms and should not be construed as limited to the embodiments set forth herein. In particular, the present invention is described below in regards to a mortise lock, but it is understood that the present invention can be used for many other locks with other configurations. The locks can also have many different shapes beyond those described herein and the internal components can be arranged in many different ways. In other embodiments, the components shown internal to the lock can be arranged external to the lock.

It is also understood that when a feature or element may be referred to as being "on" another element, it can be directly on the other element or intervening elements may also be present. Furthermore, relative terms such as "inner", "outer", "upper", "above", "lower", "beneath", and "below", and similar terms, may be used herein to describe a relationship of one layer or another region. It is understood that these terms are intended to encompass different orientations of the lock features beyond those shown in the figures.

Although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

It is also understood that when an element or feature is referred to as being "on" or "adjacent" to another element or feature, it can be directly on or adjacent the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Embodiments of the invention are described herein with reference to cross-sectional view illustrations that are schematic illustrations of embodiments of the invention. As such, the actual thickness of the layers can be different, and variations from the shapes of the illustrations as a result, for example, of manufacturing techniques and/or tolerances are expected. Embodiments of the invention should not be construed as limited to the particular shapes of the regions illustrated herein but are to include deviations in shapes that result, for example, from manufacturing. A region illustrated or described as square or rectangular will typically have rounded or curved features due to normal manufacturing tolerances. Thus, the regions illustrated in the figures are schematic in nature and their shapes are not intended to illustrate the precise shape of a region of a device and are not intended to limit the scope of the invention. The different lock embodiments can be arranged to work in different ways with some being operable to work in fail-safe or fail-secure modes.

An embodiment of a lock 10 incorporating features of the present invention is shown in FIG. 1. The lock 10 comprises primary internal components to electrically control retraction and/or extension of the latch bolt to electrically control ingress and egress through the door with the lock 10. The lock 10 generally comprises a housing 12 that can be many different shapes and sizes, but has a height, width and depth so that it can be mounted within a door and is large enough to securely hold the lock's internal components described below. The housing 12 can comprise many different rigid and durable materials, with a preferred material being a metal. Some example materials the housing can comprise include, but are not limited to: a resin, rubber, vinyl, polyurethane, poly vinyl chloride (PVC), Poly(methyl methacrylate) (PMMA), polymers/copolymer substances, acrylic substances, plastic, metal, glass, fiberglass, or a combination thereof.

Figure 2:
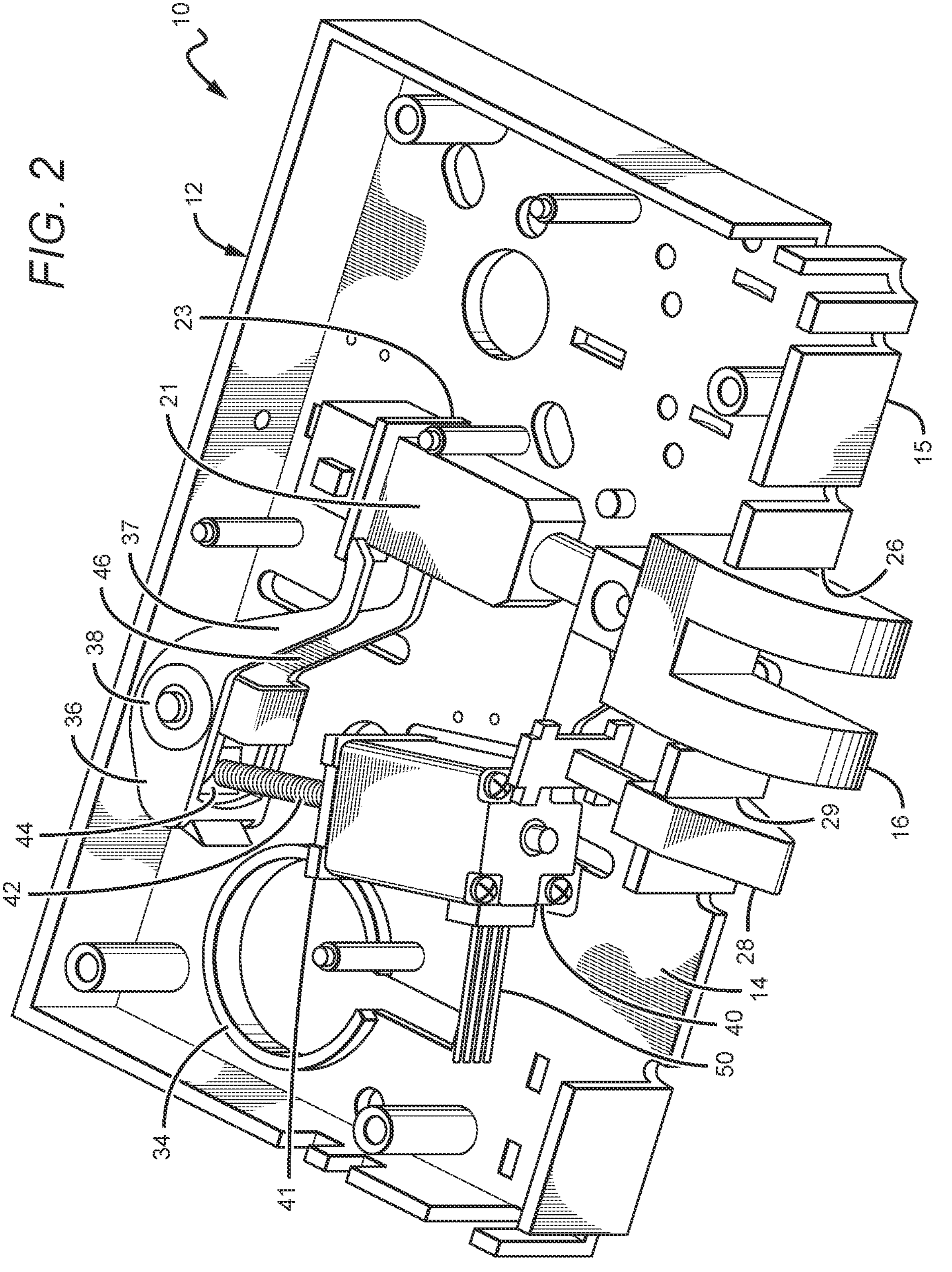
FIG. 2 is a partial perspective view of the embodiment of the lock of FIG. 1.
Figure 3:
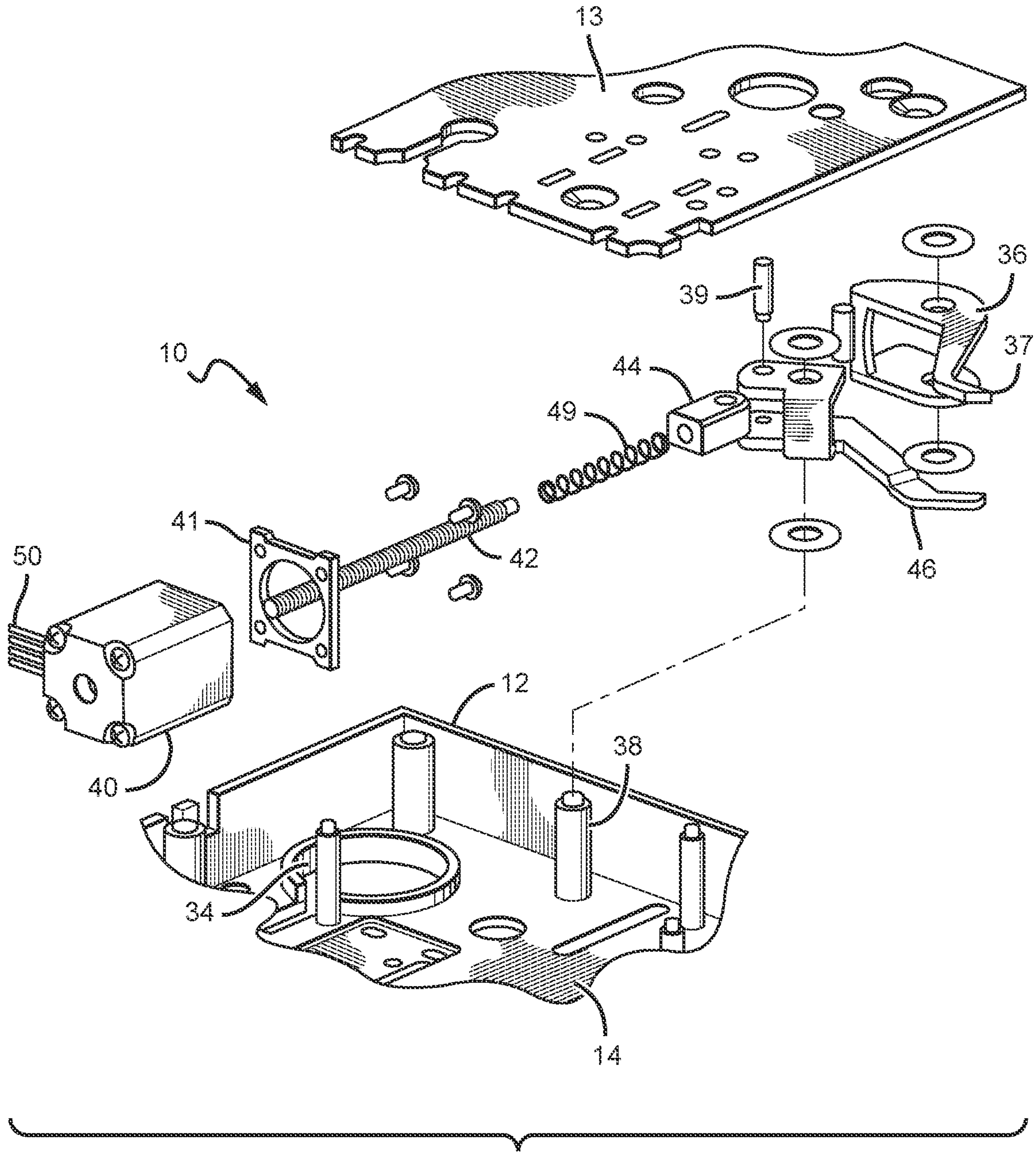
FIG. 3 is a partial exploded view of the embodiment of the lock of FIG. 1.

The housing 12 is shown in FIGS. 1 and 2 with its cover plate removed so that the internal lock components are shown to facilitate explanation of the operation of the lock's internal components. A portion of the cover plate 13 is shown in FIG. 3. It is understood, however, that when the lock 10 is finally assembled, the housing 12 can be complete with its cover plate 13 installed such that the housing 12 and its cover plate 13 surround and securely hold the internal lock components.

The housing 12 comprises a back plate 14 to which many of the lock's internal components can be mounted. The lock 10 further comprises a front plate 15 that can be arranged so that when the lock 10 is installed in the door, the front plate 15 is flush with the leading edge of the door. A latch bolt 16 is mounted within the housing 12 and a pivotally connected first retraction lever 18 is also mounted within the housing 12 in proximity to the latch bolt 16. A doorknob or opening lever ("doorknob") can be mounted to the lock 10 at the first retraction lever 18 such that rotation of the doorknob causes rotation of the first retraction lever 18. In most embodiments, an inside and outside doorknob portion can be mounted to the first retraction lever 18 with the doorknobs being on opposite sides of the lock 10; this is shown in more detail in FIG. 4, which is discussed further below.

In some embodiments, the latch bolt 16 is urged to the extended position by the bias of latch bolt spring 24, and the first retraction lever 18 has a retraction finger 20 that is mechanically coupled to the latch bolt 16 so that rotational movement of the first retraction lever 18 overcomes the bias of the latch bolt spring 24. This in turn causes the latch bolt 16 to retract into the housing 12. In some embodiments, the retraction finger 20 is coupled with a latch bolt interaction portion 21, for example, being configured such that movement of the retraction finger 20, pushes against a ledge portion 23 of the latch bolt interaction portion 21, moving the interaction portion 21 and therefore moving the latch bolt 16.

The interaction portion 21 can comprise any suitable material allowing for the first retraction lever to interact with it and move the latch bolt 16, including any of the materials listed in regard to the housing 12. The latch bolt interaction portion 21 can comprise the same material as the latch bolt 16 or can comprise a different material. The latch bolt interaction portion 21 can be a portion of the latch bolt 16 itself or can be another structure connected to the latch bolt 16.

In some embodiments, the lock 10 further comprises a first retraction lever stop mechanism 31, which is configured such that the first retraction lever 18 and/or the first retraction lever retraction finger 20 abuts against the first retraction lever stop mechanism in a resting position, holding the latch bolt 16 against its bias to prevent further extension of the latch bolt 16 from the housing 12. The first retraction lever stop mechanism 31 can also prevent motion of the first retraction lever 18 in a given direction. For example, while the first retraction lever 18 can typically move in a first direction and retract the latch bolt 16 and move in a second direction and extend the latch bolt 16, the first retraction lever stop mechanism 31 can limit how far the first retraction lever 18 can move in the first or second direction to limit the extendibility or retractability of the latch bolt 16.

As shown in FIG. 1, the front portion of the latch bolt 16 extends through a bolt opening 26 in the front plate 15 in its extended position and is arranged to engage a strike plate (not shown) in a door frame. The latch bolt 16 can also be retracted as described above so that all or most of the front portion of the latch bolt is retracted into the housing 12. In normal use, the door lock 10 is mounted in a door to allow a user to operate a doorknob and the latch bolt 16 to release the door. When the door is locked by the door lock 10, the latch bolt 16 extends from front plate 15 to engage a strike plate. When the latch bolt 16 is retracted and disengages from the strike plate, the door can be opened.

In some embodiments, an auxiliary latch 28 can be mounted within the housing 12, being substantially parallel to the latch bolt 16, and can comprise a front portion that extends from auxiliary latch opening 29 in the front plate 15. The auxiliary latch 28 can be urged by an auxiliary latch spring 32 to the extended position, and the auxiliary latch 28 can be moved to a retracted position within the housing 10, against the force of the auxiliary latch spring 32, by a force applied to the end of auxiliary latch 28. In operation, the auxiliary latch 28 and auxiliary latch spring 32 cooperate to hold the latch bolt 16 at a predetermined position.

In one embodiment according to the present invention, the auxiliary latch 28 is arranged such that when in its retracted position, the latch bolt 16 can only be retracted by the inside doorknob and the key cylinder 33. When the auxiliary latch 28 is in its extended position, the latch bolt 16 can be retracted. In operation, when the door is closed, the auxiliary latch can be compressed by the frame of the door or the strike plate, and can hold the latch bolt 16 at its extended position such that the latch bolt 16 is blocked against operation driven by the outside doorknob.

A key cylinder 33 can be mounted within a cylinder opening 34, and a bolt lever 36 can extend between the latch bolt 16 and the key cylinder 33. Operation of the key cylinder 33 causes the bolt lever 36 to move, for example, about a bolt lever pin 38, such that when the proper key is inserted in the key cylinder 33 and rotated, the bolt lever 36 is rotated about the bolt lever pin 38. When the end 37 of the bolt lever 36 adjacent the latch bolt 16 moves away from the front plate 15, the bolt lever 36 operates on the latch bolt 16 such that the latch bolt 16 retracts into the lock housing 12. In some embodiments, the bolt lever end 37 can be configured to interact with the latch bolt 16, the latch bolt interaction portion 21, and/or the ledge portion 23 of the latch bolt interaction portion 21, in a manner similar to the retraction finger 20 described above.

An electrically controllable actuator 40 is included within the lock 12 to retract the latch bolt 16 in response to an electrical signal. Many different actuators can be used such as different motors or solenoids, with the embodiment shown comprising a rotational motor that is mounted in the housing 10 by a motor mount 41, although it is understood that when the present description refers to the motor 40, other types of actuators can also be utilized. A threaded lead screw is connected to and/or arranged within the central opening of the motor 40.

The motor 40 can be arranged to operate in different ways, and in one embodiment, the motor 40 can be arranged to rotate the threaded lead screw 42 with the threads cooperating with other features to cause motion. In other embodiments, the motor 40 can be arranged such that operation of the motor 40 causes the threaded lead screw 42 to extend or retract from the motor along the threads of the lead screw 42. In some embodiments, the motor 40 can have internal threads (such as on a threaded nut) that cooperate with the threads on the threaded screw, for example, utilizing a male-female thread connection, to cause extension or retraction of the threaded lead screw 42 from the motor 40.

The lock 10 can further comprise a clevis 44 (best shown in FIG. 3) that can be mounted on, or otherwise connected to, the threaded lead screw 42 at the end opposite the motor 40. The clevis 44 can also be moveably mounted or connected to one end of a second retraction lever 46, with the opposing end of the second retraction lever 46 engaging the latch bolt 16, the latch bolt interaction portion 21, and/or the ledge portion 23 of the latch bolt interaction portion 21, in a manner similar to the retraction finger 20 of the first retraction lever 18 described above.

The second retraction lever 46 can be mounted in, or otherwise connected to, many different locations, for example, being mounted to the same bolt lever pin 38 as the bolt lever 36, or being mounted to an alternate bolt lever pin 39, which can be connected to the second retraction lever 46 (as shown in FIG. 3). The alternate bolt lever pin 39 can allow the clevis 44 to rotate about the alternate bolt lever pin 39 in relation to the second retraction lever 46. This configuration helps allow the clevis 44 to influence the movement of the second retraction lever 46 in a manner independently of influencing movement of the bolt lever 36. This is due to the clevis 44 being mounted to the second retraction lever 46 via the alternate bolt lever pin 39, such that it does not share the same bolt lever pin 38 as the bolt lever 36.

The relationship between various internal components of the lock 10 can be better viewed in FIG. 2, which shows the lock 10, with some components removed to better show some of the key components that can be electrically controlled by the motor 40. Like FIG. 1, FIG. 2 shows that the lock 10 can comprise the housing 12, the back plate 14, the front plate 15, the latch bolt 16, the latch bolt interaction portion 21, the ledge portion 23 of the latch bolt interaction portion 21, a bolt opening 26, the auxiliary latch 28, the auxiliary latch opening 29, the cylinder opening 34, the bolt lever 36, the bolt lever end 37, the bolt lever pin 38, the electrically controllable actuator 40, the motor mount 41, the threaded lead screw 42, the clevis 44, and second retraction lever 46.

FIG. 2 shows the arrangement of the various features to allow for electrical control of the lock 10 as described herein. Additionally shown in FIG. 2 is a signal communication component 50, which is configured to receive an electrical signal, for example, from a key cylinder or a wireless remote device, and activate the electrically controllable actuator 40 to cause movement of the latch bolt 16, for example, by causing movement of the lead screw 42, the clevis 44 and the second retraction lever 46, as will be described in greater detail further below.

The locks incorporating features of the present invention and the signal communication component 50 can comprise many different configurations. For example, locks incorporating features of the present invention can comprise electrical conductors to carry electrical signals from outside the lock 10 to the motor 40 and/or its PCB. Many different conductors can be used, with some embodiments comprising insulated wires. These conductors can carry signals from a control mechanism that controls a single lock, or can carry a signal from a system that controls many locks, such as throughout a building. It is understood that other locks according to the present invention can be controlled wirelessly instead of through conductors. Some of these embodiments can be controlled through Bluetooth® wireless communication, while others can use different wireless communication protocols or systems.

In further describing the operation of the lock 10 utilizing the motor 40, the clevis 44, and the second retraction lever 46, FIG. 3 is now referenced, which shows the lock 10 as described above, comprising the housing 12, the cover plate 13, the back plate 14, the cylinder opening 34, the bolt lever 36, the end 37 of bolt lever 36, the bolt lever pin 38, the electrically controllable actuator 40, the motor mount 41, the threaded lead screw 42, the clevis 44, the second retraction lever 46, and the signal communication component 50. Movement of the clevis 44 by the motor 40 causes the second retraction lever 46 to rotate about the bolt lever pin 38, thereby causing movement of the latch bolt 16.

In the embodiment shown, retraction of the threaded lead screw 42 into the motor 40 causes the clevis 44 to move toward the motor 40. This in turn causes the second retraction lever 46 to rotate about the bolt lever pin 38 with the end of the second retracting lever 46 opposite the clevis 44 causing retraction of the latch bolt 16. When the latch bolt 16 is fully retracted, it disengages from the door strike and the door with the lock 10 can be opened.

The extension of the threaded lead screw 42 from the motor 40 causes movement of the clevis 44 away from the motor 40, which in turn allows extension of the latch bolt 16 from the housing 10. The latch bolt 16 can then engage the door strike to hold the door in the closed position.

The locks according to the present invention can be arranged in different ways to be electrically controlled extension or retraction of the latch bolt. In some embodiments, this can be the primary mechanism for controlling the latch bolt 16. In other embodiments, the electrically controllable features can be used in conjunction with manual latch bolt retraction mechanisms. By way of example, the lock 10 shown in FIGS. 1-3 comprises a plurality of mechanisms for retracting the latch bolt 16. It can be retracted manually by the door handle or door lever, or by operation of the key cylinder. To compliment these manually operable control mechanisms, the lock 10 also has the electrically operable mechanism described above.

Many locks according to the present invention are relatively small or thin, and have relatively little space for additional components. The electrically operable latch retraction mechanisms according to the present invention are typically arranged within small spaces and arranged in different ways to cause retraction of the latch bolt 16. In the embodiment shown, there is not sufficient space to directly operate on the latch bolt to cause retraction. Instead, an actuator/motor 40 is used with the second retraction lever 46 to cause the retraction of the latch bolt 16.

The motor 40 can be arranged with the second retraction lever 46 such that movement of the threaded lead screw 42 in one direction causes movement of the latch bolt 16 in the opposite direction. For example, movement of the threaded lead screw 42 toward the motor 40 causes movement of the clevis 44 toward the motor 40. This in turn causes movement of the end of the second retraction lever 46 at the clevis 44 to move toward the motor 40, which causes movement of the second retraction lever 46 opposite the clevis 44 to move away from the motor 40, resulting in the latch bolt 16 moving away from the motor 40. This movement causes retraction of the latch bolt 16.

When the motor 40 causes movement of the threaded lead screw 42 in the opposite direction, the clevis 44 moves away from the motor. This in turn causes the end of the second retraction lever 46 opposite the clevis 44 to move toward the motor 40, thereby allowing movement of the latch bolt 16 toward the motor 40. This allows for extension of the latch bolt 16.

This opposing movement of motor 40 and latch bolt 16 allows for different electrical arrangements within different locks having relatively small internal spaces. It is understood that this opposing movement can be provided with many different mechanisms arranged in different ways. It is also understood that different bias mechanisms can be used to bias the lock and its retraction mechanism to a particular state when power is off or lost.

FIG. 3 further shows that a spring 49 can be included on, or otherwise connected to, the threaded lead screw 42 to bias the threaded lead screw 42 to extend from the motor 40. This configuration therefore biases the second retraction lever 46 to allow for the latch bolt 16 to be in its extended position in a "resting" state absent an electrical signal to the motor 40. This is only one of the many examples of how a biasing element might be arranged in locks according to the present invention.

It is understood that locks according to the present invention can also comprise control circuitry that can be arranged fully within the housing, fully outside of the housing, or partially within and partially outside of the housing. In some embodiment, the circuitry can be included on one or more printed circuit boards (PCB or PCBs) that can be in these different locations. In some embodiments the PCB can be mounted on one of the housing plates, such as the back plate, cover plate or front plate, and can encapsulated to provide protection. Similarly, and PCB mounted outside of the housing can also be encapsulated.

It is understood that the locks according to the present invention can have one or more sensors to monitor and report the condition of various lock components. For example, a sensor can be included to sense the position of the latch in the extended and/or retracted position. This information can be used for different purposes such as feedback for the motor control logic and or to produce a latch status signal to report to an external monitoring, control or indicating device or system. Many different types of sensors can be used including, but not limited to mechanical, electronic or virtual devices. The status signal can be reported through hard wired conductors or wirelessly, such as by Bluetooth® wireless communication.

Figure 4:
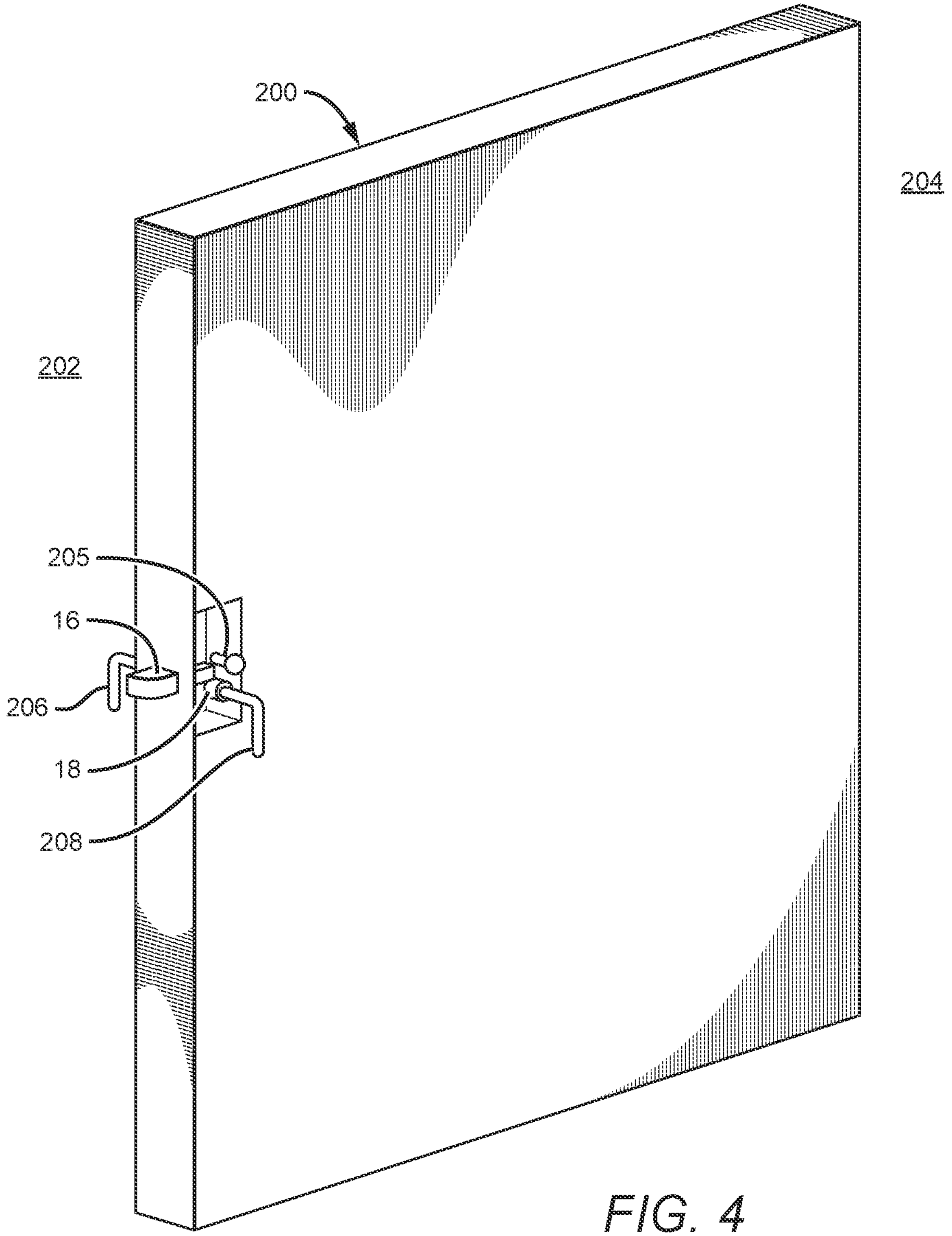
FIG. 4 is a perspective view of an example installation of a lock incorporating features of the present invention into a door.

One example configuration of the lock 10 installed into a door 200 is set forth in FIG. 4, which shows the door 200 dividing an internal space 202 from an external space 204. The lock 10 is shown installed within the door 200, in a mortise lock configuration. The first retraction lever 18 is shown as being internal to the lock 10, and therefore the door 200. Shown connected to the first retraction lever 18 is a manually operable opening lever 205. In the embodiment shown, the manually operable opening lever 205 comprises a doorknob structure comprising an inside doorknob portion 206 and an outside doorknob portion 208, although it is understood that any suitable mechanism capable of causing movement of the first retraction lever 18 can be used. Movement of the inside doorknob portion 206 portion or the outside doorknob portion 208 causes movement of the first retraction lever 18, which in turn causes movement of the latch bolt 16.

Although the present invention has been described in considerable detail with references to certain preferred configurations thereof, other versions are possible. The invention can be used in different locks and different components can be used in the locks described above. Many different solenoids can be used in the lock including single or multiple stage coils that are operable with different voltages, such as 12 or 24 volts. The steps taken above to interchange the lock between failsafe and fail-secure modes can be taken in different order and different steps can be used. Therefore the spirit and scope of the claims should not be limited to the preferred version contained herein.

The foregoing is intended to cover all modifications and alternative constructions falling within the spirit and scope of the invention as expressed in the claims, wherein no portion of the disclosure is intended, expressly or implicitly, to be dedicated to the public domain if not set forth in any claims.

We claim:

1. An electric lock, comprising:

a housing;

a latch bolt within said housing;

a bias mechanism configured to bias said latch bolt in a position extended from said housing by interacting with an interaction portion of said latch bolt;

at least one retraction lever, said at least one retraction lever configured such that said at least one retraction lever interacts with said interaction portion of said latch bolt such that movement of said at least one retraction lever causes said latch bolt to retract into said housing against said bias;

an electrically controllable actuator, said electrically controllable actuator configured to move said at least one retraction lever to retract said latch bolt in response to an electrical signal; and a lead screw, wherein said electrically controllable actuator is connected to said lead screw and said electrically controllable actuator is configured to move said lead screw towards or away from said electrically controllable actuator.

2. The electric lock of claim 1, wherein movement of said lead screw in a one direction causes movement of said latch bolt in the opposite direction.

3. The electric lock of claim 1, wherein said at least one retraction lever is pivotally connected to said housing by at least one bolt lever pin.

4. The electric lock of claim 1, further comprising a clevis, wherein said clevis is connected to said lead screw, said at least one retraction lever and said electrically controllable actuator, wherein movement of said clevis by said electrically controllable actuator causes movement of said at least one retraction lever.

5. The electric lock of claim 4, wherein movement of said clevis in a one direction causes movement of said latch bolt in the opposite direction.

6. The electric lock of claim 4, wherein movement of said clevis toward said electrically controllable actuator causes movement of said at least one retraction lever away from said electrically controllable actuator.

7. The electric lock of claim 1, wherein said electrically controllable actuator comprises a motor.

8. The electric lock of claim 1, further comprising a key cylinder and bolt lever, said key cylinder configured such that operation of said key cylinder causes movement of said bolt lever, which in turn causes movement of said latch bolt.

9. An electric lock, comprising:

a housing;

a latch bolt within said housing;

a bias mechanism configured to bias said latch bolt in a position extended from said housing;

a first retraction lever, said first retraction lever configured such that said first retraction lever interacts with an interaction portion of said latch bolt such that movement of said first retraction lever causes said latch bolt to retract into said housing against said bias;

a second retraction lever, said second retraction lever configured such that said second retraction lever interacts with said interaction portion of said latch bolt such that movement of said second retraction lever causes said latch bolt to retract into said housing against said bias;

a manually operable opening lever, said manually operable opening lever connected to said first retraction lever such that movement of said manually operable opening lever causes said first retraction lever to retract said latch bolt; and an electrically controllable actuator, said electrically controllable actuator configured to move said second retraction lever to retract said latch bolt in response to an electrical signal.

10. The electric lock of claim 9, wherein said second retraction lever is pivotally connected to said housing by at least one bolt lever pin.

11. The electric lock of claim 10, further comprising a key cylinder and a bolt lever, said key cylinder configured such that operation of said key cylinder causes movement of said second retraction lever, which in turn causes movement of said latch bolt.

12. The electric lock of claim 11, further comprising a lead screw, wherein said electrically controllable actuator is connected to said lead screw and said electrically controllable actuator is configured to move said lead screw towards or away from said electrically controllable actuator.

13. The electric lock of claim 12, further comprising a clevis, wherein said clevis is connected to said lead screw, said second retraction lever and said electrically controllable actuator, wherein movement of said clevis by said electrically controllable actuator causes movement of said second retraction lever.

14. The electric lock of claim 13, wherein movement of said clevis in a one direction causes movement of said latch bolt in the opposite direction.

15. The electric lock of claim 14, wherein movement of said clevis toward said electrically controllable actuator causes movement of said second retraction lever away from said electrically controllable actuator.

16. An electric lock, comprising:

a housing;

a latch bolt within said housing;

a bias mechanism configured to bias said latch bolt in a position extended from said housing;

a first retraction lever, said first retraction lever configured such that said first retraction lever interacts with an interaction portion of said latch bolt such that movement of said first retraction lever causes said latch bolt to retract into said housing against said bias;

a second retraction lever, said second retraction lever configured such that said second retraction lever interacts with said interaction portion of said latch bolt such that movement of said second retraction lever causes said latch bolt to retract into said housing against said bias;

a door knob, said door knob comprising an inside door knob portion and an outside door knob portion, said door knob connected to said first retraction lever such that movement of said inside doorknob portion or said outside doorknob portion causes said first retraction lever to move;

an electrically controllable actuator, said electrically controllable actuator configured to move said second retraction lever to retract said latch bolt in response to an electrical signal; and at least one auxiliary latch within said housing, said at least one auxiliary latch comprising an extended position and a retracted position.

17. The electric lock of claim 16, wherein said at least one auxiliary latch is configured such that when said at least one auxiliary latch is in said retracted position, said latch bolt cannot retract into said housing in response to movement of said outside door knob portion.

18. The electric lock of claim 17, wherein said at least one auxiliary latch is urged by at least one auxiliary latch spring to said extended position and can be moved to said retracted position against the force of said at least one auxiliary latch spring by a force applied to the end of said at least one auxiliary latch.

* * * * *